US006269274B1

(12) United States Patent
Steinman et al.

(10) Patent No.: US 6,269,274 B1
(45) Date of Patent: Jul. 31, 2001

(54) SYSTEM AND METHOD FOR BALANCING AND DISTRIBUTING CONTROL ALGORITHM PROCESSING LOAD AND REAL TIME PLANT CONTROL SYSTEM EMPLOYING THE SAME

(75) Inventors: Jethro F. Steinman, Havertown; Richard P. Himmer, Blue Bell; Irina Radomy, Langhorne, all of PA (US)

(73) Assignee: Honeywell International Inc, Morristown, NJ (US)

( * ) Notice: Subject to any disclaimer, the term of this patent is extended or adjusted under 35 U.S.C. 154(b) by 0 days.

(21) Appl. No.: 09/150,153

(22) Filed: Sep. 9, 1998

(51) Int. Cl.$^7$ .................................................. G05B 13/02
(52) U.S. Cl. ............................................. 700/28; 709/105
(58) Field of Search .................................. 700/28, 24, 32, 700/33, 79, 80, 105; 714/10; 712/10, 17

(56) References Cited

U.S. PATENT DOCUMENTS

| | | | |
|---|---|---|---|
| 5,471,622 | * 11/1995 | Eadline | 707/3 |
| 5,701,482 | 12/1997 | Harrison et al. | 709/105 |
| 5,845,116 | * 12/1998 | Saito et al. | 709/103 |
| 5,901,058 | 5/1999 | Steinman et al. | 700/1 |
| 6,076,174 | * 6/2000 | Freund | 714/47 |
| 6,104,962 | * 8/2000 | Sastry | 700/86 |

OTHER PUBLICATIONS

Hac A., et al: "Dynamic Load Balancing In A Distributed System Using A Decentralized Algorithm." Intl Conf On Distributed Comuting Systems, Us,Washington, IEEE Comp.Soc.Press.vol.Conf.7, pp. 170–177, XP002105823.

Johnson, I.D., et al: "On The Performance Of Load Balancing Algorithms In Distributed Systems." IFIP World Computer Congress, NL, Amsterdam, North Holland, vol. Congress 11, pp. 175–180, XP000079008.

* cited by examiner

Primary Examiner—William Grant
Assistant Examiner—Chad Rapp
(74) Attorney, Agent, or Firm—Hitt Chwang & Gaines (57) ABSTRACT

For use in a digital process controller (DPC), a system for, and method of, balancing a control algorithm processing load and distributing the load over a given time interval and a real time plant control system employing the system or the method. In one embodiment, the system includes: (1) a model for estimating execution time of at least one control algorithm based on configuration data applied to that algorithm, the DPC capable of balancing and distributing the load based on the estimate generated by the model and (2) a data entry process, associated with the model, that allows an empirically-determined execution time to be associated with at least one control algorithm, the DPC capable of balancing and distributing the load based on the time in lieu of the model based estimate and balancing and distributing the load upon configuration of at least one control algorithm.

18 Claims, 4 Drawing Sheets

SYSTEM AND METHOD FOR BALANCING AND DISTRIBUTING CONTROL ALGORITHM PROCESSING LOAD AND REAL TIME PLANT CONTROL SYSTEM EMPLOYING THE SAME

TECHNICAL FIELD OF THE INVENTION

The present invention is directed, in general, to computing and processing systems and, more specifically, to a system and method for balancing and distributing control algorithm processing load and a real time plant control system that employs the system or the method.

BACKGROUND OF THE INVENTION

Automated process control systems include a comprehensive set of control algorithms, or software-definable process control routines, to control and monitor various processes within, for instance, a manufacturing facility. The control systems can be tailored to satisfy a wide range of process requirements globally or within specified portions of the facility. Conventionally, the control systems include a variety of modules, each having its own processor or firmware, linked together by communication buses to result in a distributed process control system. The distributed nature of the system affords high performance with the capability to expand the system incrementally to satisfy growth or modifications in the facility.

To allow a user to tailor a process control system to a particular processing environment, it is important to provide such systems with highly-configurable and adaptable control systems. Process control systems generally provide a means by which users can create custom control strategies, e.g., software-definable process control routines. In object-oriented programming environments, a complete control strategy may be built from smaller components, such as "blocks" and "parameters." A block is a software construct, or "object," used to encapsulate the data and the algorithms of elemental control computations; parameters define the interface to individual pieces of data within a block.

Digital process controllers (DPCs) are generally required to meet a series of requirements on the manner in which they process control algorithms. For example, they must execute the control algorithms in a periodic fashion. The control algorithms must be executed at a sample rate, where the sample rate "jitter" is sufficiently low compared to the tolerance of process dynamics. DPCs may be required to execute additional algorithms whose functions are essential for the overall process control mission but are not periodic and predictable, e.g., communication with supervisory display and control stations, communication with peer controllers, event distribution and housekeeping tasks. DPCs must execute non-periodic algorithms in a way which does not interfere with deterministic execution of periodic control algorithms as long as DPCs are configured within a defined operating range.

To meet these above-described requirements, DPCs are required to balance the control algorithm processing load and distribute it over the time interval of the DPCs' fundamental repetition rate. Conventional DPCs, such as Honeywell Inc. TDC3000 controllers known as "Process Manager," "Advanced Process Manager" and "High Performance Process Manager," pre-qualify a configuration and accept or reject the configuration on the basis of predicted potential for overload. These DPCs, however, do not support manual balancing, balancing a subset of algorithms while other algorithms maintain control, user measurement of execution time for a particular algorithm or associating execution time with an algorithm as a characteristic attribute.

On the other hand, other conventional DPCs, such as Honeywell's "Alcont Process Manager," provide only for manual balancing of the algorithm processing load. These DPCs, however, do not support qualification of an algorithm load on the basis of a model computation or rejection of a load which is too high. Still other DPCs, such as Honeywell's "TPS Networks Safety Manager," provide for computing execution time from characteristics of a particular algorithm configuration, but do not support balancing of subset algorithms while other algorithms maintain control.

Therefore, what is needed in the art is an improved method for managing algorithm processing load within a process controller that incorporates all the above-described features into one controller. More particularly, what is needed in the art is a method that provides flexible management of algorithm processing load.

SUMMARY OF THE INVENTION

To address the above-discussed deficiencies of the prior art, it is a primary object of the present invention to provide a far more flexible and powerful way to balance and distribute control algorithm processing loads.

In the attainment of the above primary object, the present invention provides, for use in a digital process controller (DPC), a system for, and method of, balancing control algorithm processing load and distributing the load over a given time interval and a real time plant control system employing the system or the method. In one embodiment, the system includes: (1) a model for estimating execution time of at least one control algorithm based on the configuration data applied to that algorithm, the DPC capable of balancing and distributing said load based on the estimate generated by the model and (2) a data entry process, associated with the algorithm model, that allows an empirically-determined execution time to be associated with at least one control algorithm, the DPC capable of balancing and distributing the load based on the time in lieu of the model based estimate and balancing and distributing the load upon configuration of at least one control algorithm.

The present invention therefore introduces a model-based control algorithm balancing and distribution system in which data pertaining to each control algorithm to be balanced are employed to derive an estimated execution time, but to which the user may optionally supply overriding, empirically-determined (perhaps actually measured, perhaps formulaically analyzed, perhaps intuitively guessed) execution times.

The system can run the model at the time that particular control algorithms are configured to allow balancing and distributing to occur iteratively and interactively, if desired. Alternatively, in one embodiment of the present invention, the data entry process allows the user to balance and distribute the load under the user own control.

In one embodiment of the present invention, the model allows at least one control algorithm to be configured and the load to be balanced and distributed without interrupting operation of other control algorithms. Alternatively, the system can interrupt execution of the other control algorithms to pause or stop while balancing and distribution take place.

In one embodiment of the present invention, a selected one of the data or the time is replicated in the model for each instance of at least one control algorithm. Preferably, the user does not have to associate the data or the time with each occurrence of a given control algorithm. In some embodiments, however, the user can perform such manual association.

In one embodiment of the present invention, the configuration data includes an algorithm type, an algorithm execution time, an algorithm block count and a data flow connection count. Those skilled in the art are aware that other configuration data types may also be advantageously employed with the present invention.

In one embodiment of the present invention, at least one control algorithm forms a portion of a control module having configuration parameters selected from the group consisting of: (1) period, (2) estimated weight and (3) phase. The model employs the configuration parameters to balance and distribute processing load. Of course, additional or other parameters may be desirable in a given application.

In one embodiment of the present invention, the model is capable of providing an actual execution time of at least one control algorithm to a user. This allows the user to evaluate at least one control algorithm's performance and make decisions based thereon.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figures 1, 2:
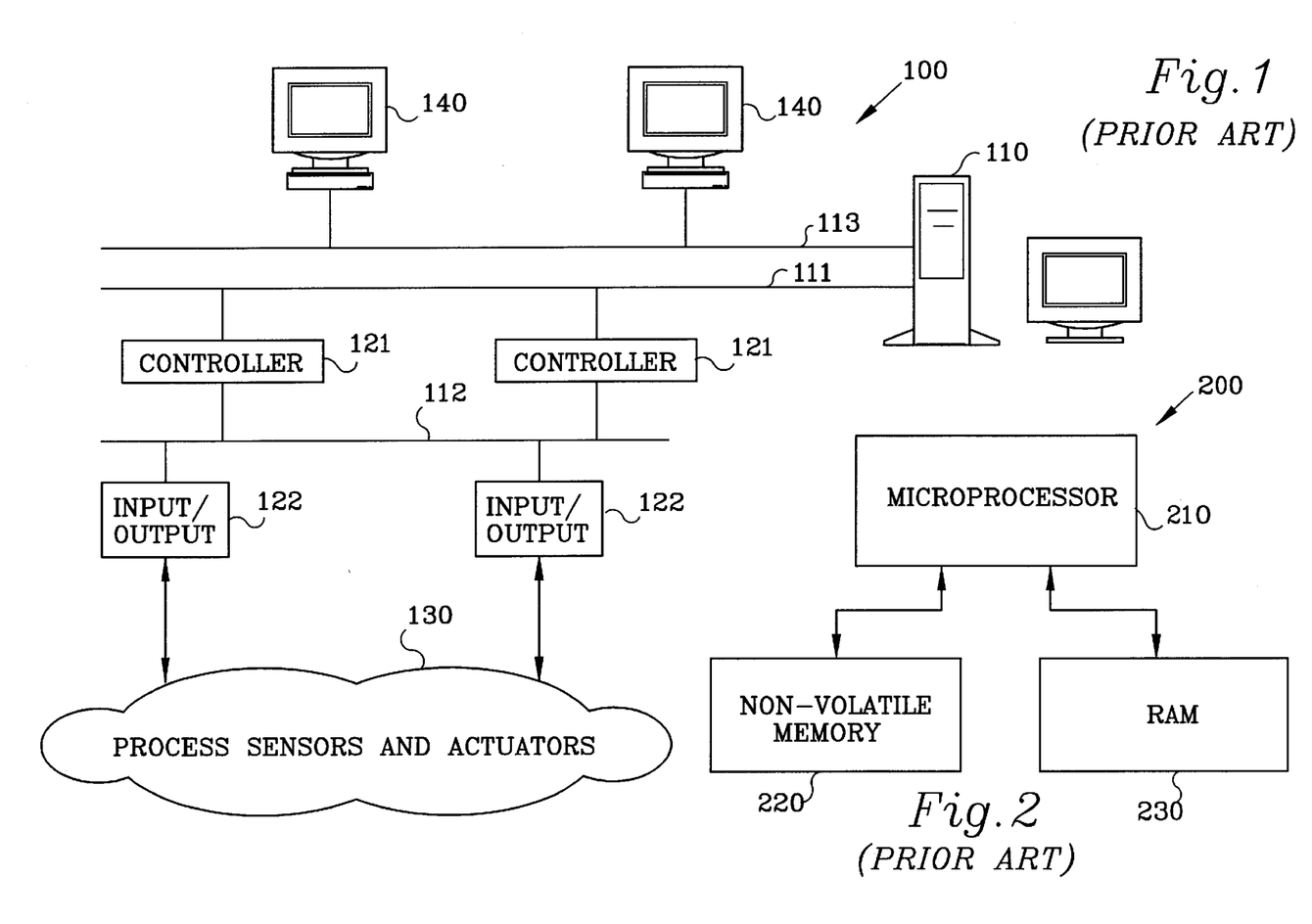
FIG. 1 illustrates a functional diagram of an exemplary distributed, real-time process control system with which the present invention may suitably be used.
FIG. 2 illustrates a high-level block diagram of an exemplary digital processing system that may be employed to execute software-definable process control routines embodying the principles of the present invention.

Before undertaking a description of the exemplary embodiments of the systems and methods of the present invention, it will be helpful to describe a computing or processing system environment in which the present invention may suitably be used or implemented. Referring initially to FIG. 1, illustrated is a functional diagram of an exemplary distributed, real-time process control system (generally designated 100) with which the present invention may suitably be used.

Process control system 100 illustratively includes a computer network having a server 110 and a controller network 111. The controller network 111 provides an interface between the server 110 and DPCs (generally designated 121); the controller network 111 may, for example, carry supervisory messages between the server 110 and DPCs 121, and peer-to-peer messages between the DPCs 121. The DPCs 121 communicate with input/output (I/O) devices 122 via an I/O network 112. The DPCs 121 are adapted to execute software-definable process control routines for controlling and receiving data from process sensors and actuators 130 via I/O devices 122 and I/O network 112. Those skilled in the art are familiar with various types of process sensors and actuators 130, such as electrically-controllable motors, valves or pumps, that may be employed in the manufacture of sundry products; the principles of the present invention are not limited to a specific process or processing system, however, but may readily be employed to advantage in any such system.

In one embodiment, the process control system 100 further includes a local area network (LAN) 113 that provides an interface between the server 110 and remote workstations (generally designated 140). System operators may employ the remote workstations 140 to control and monitor the operation of the process control system 100. Although illustrated as a separate network, the LAN 112 and controller network 111 may be the same, i.e., the remote workstations 140 and the DPCs 120 may share the same network transmission medium. Those skilled in the art will recognize, however, that providing separate networks for control systems and operator workstations may enhance the reliability of a distributed, real-time process control system, e.g., network traffic on LAN 112 associated with distributing process-related data from server 110 to operator workstations 140 will not interfere with process control information transmitted between server 110 and remote DPCs 120 via control network 111.

Software-definable process control routines may be executed by any digital processing system, such as server 110, workstations 140, or DPCs 121. FIG. 2 illustrates a high-level block diagram of an exemplary digital processing system 200 that may be employed to execute software-definable process control routines embodying the principles of the present invention. Exemplary digital processing system 200 includes a microprocessor 210, non-volatile memory 220, and random access memory (RAM) 230. Non-volatile memory 220, which is employed to store software-definable process control routines, may comprise, for example, a programmable read-only memory (PROM), flash ROM, or a magnetic storage medium. The software-definable process control routines stored in non-volatile memory 220 are executed by microprocessor 210. The microprocessor employs RAM 230 to store all or portions of the process control routines as the routines are executed, as well as storage for process control data associated with process sensors and actuators 130. The description of exemplary digital processing system 200 is merely illustrative; those skilled in the art will recognize that software-definable process control routines employing the principles of the present invention are not limited to a specific hardware implementation for digital processing system 200, and that all such systems are within the scope of the claims recited hereinafter.

To understand the principles of the present invention, it is necessary to define the "environments" necessary to support the present invention. The first is an Application Builder environment. The Application Builder environment provides services which allow the end user to configure control strategies and load them to the controller. The second environment is the controller itself. The controller receives configurations at the time of load, registers them with internal support services and executes them at run time. Those skilled in the art should readily recognize that the Application Builder does not necessarily have to reside in any one particular location. The Application Builder environment may be resident in a variety of supervisory platforms.

Within a DPC employing object-oriented programming, i.e., an "object-oriented controller," algorithms and their associated data can be implemented as objects called "blocks." Data within a block can be read from, or written to, named attributes of blocks, called "parameters." Data flow between different blocks can be accomplished by establishing a "connection" from an output parameter of one block to an input parameter of a second block.

Control strategies are created as a set of blocks, each of which encapsulate a necessary constituent of the total control strategy. One block, called a "control module," serves as a container for more elemental algorithm blocks and for the connections which cause data to flow between them. The overall process of creating a control module consists of using the Application Builder to insert algorithm blocks, make connections between block parameters and assign values to configuration parameters. Once a control module has been created, services of the Application Builder are used to load that control module to the controller.

Within the context of the Application Builder and controller environments, the task of managing algorithm processing load becomes synonymous with the task of managing processing load for the control module. Using the principles of the present invention, in advantageous embodiments, the control modules may support the following configuration parameters; e.g., "PERIOD," "ESTWEIGHT" and "PHASE" where:

PERIOD establishes the repetitive cycle time of the control module and all its component algorithm blocks. PERIOD is confined to values which are multiples of the lowest PERIOD supported by the controller, called, for example, BASEPERIOD.

ESTWEIGHT holds an estimated value for the execution time of the control module. This value may be explicitly configured by the end user on the basis of direct measurements, or if left unconfigured (null), it is estimated by the Application Builder on the basis of a model. The nature of the model used to compute ESTWEIGHT is not necessary to describe the practice of the present invention.

PHASE holds a value which directs the controller to run the control module in a particular phase of the selected PERIOD. Possible values of PHASE are, e.g., from 0 to (PERIOD modulo BASEPERIOD). If the end user wishes to manually balance the load, the end user assigns a specific value to the PHASE parameter, within its allowed range. In an advantageous embodiment, if the user wishes the controller to balance the load automatically, he leaves the PHASE value unassigned (null).

When a control module is loaded to the controller, the loaded data include the values of the PERIOD, ESTWEIGHT and PHASE parameters. The controller uses these parameters as inputs to the overall process of load balancing and qualification. The PHASE parameter, however, is key in the way it triggers these operations.

The concept of PHASE is closely related to the concept of controller execution "cycles." Each "cycle" is a time interval of length BASEPERIOD which is configured to execute a specific set of control modules. To illustrate scheduling within cycles, suppose a controller is to support a simple configuration of control modules described by the following Table; assuming that BASEPERIOD is 50 ms.

TABLE 1

| Control Module Name | Configuration | |
| --- | --- | --- |
| | PERIOD | PHASE |
| CMa | 200 ms | 0 |
| CMb | 100 ms | 0 |
| CMc | 50 ms | 0 |
| CMd | 200 ms | 1 |
| CMe | 50 ms | 0 |
| CMf | 100 ms | 1 |
| CMg | 200 ms | 3 |

The configuration described in TABLE 1 assigns a value of PERIOD and PHASE to each control module. These two values completely constrain the manner in which each control module executes within the controller's cycle scheme. The resulting execution pattern is illustrated below in TABLE 2.

TABLE 2

| PERIOD | | | | | | | | | | | |
| --- | --- | --- | --- | --- | --- | --- | --- | --- | --- | --- | --- |
| 50 ms | PHASE → | 0 | 0 | 0 | 0 | 0 | 0 | 0 | 0 | 0 | ... |
| 100 ms | PHASE → | 0 | 1 | 0 | 1 | 0 | 1 | 0 | 1 | 0 | ... |
| 200 ms | PHASE → | 0 | 1 | 2 | 3 | 0 | 1 | 2 | 3 | 0 | ... |
| Cycle → Block Execution Sequence → | | 0 CMe CMc CMb CMa | 1 CMf CMe CMd CMc | 2 CMe CMc CMb | 3 CMg CMf CMe CMc | 4 CMe CMc CMb CMa | 5 CMf CMe CMd CMc | 6 CMe CMc CMb | 7 CMg CMf CMe CMc | 8 CMe CMc CMb CMa | ... ... |

From the patterns in TABLE 2 above, it can be seen that the values of PERIOD and PHASE together completely determine how a control module executes within the controller. PERIOD determines the repetition rate and PHASE determines which of a finite set of available cycles, a control module executes within. For instance, at a PERIOD of 200 ms, CMd has possible PHASE selections of 0, 1, 2 and 3.

Since the selected PHASE was 1, CMd executes in cycles 1, 5, 9, 13 and so on. Control modules whose periods are assigned equal to the BASEPERIOD have only one option for PHASE: 0. Since the largest execution period used in the above example is 200 ms, cycles 0–3 are equivalent to cycles 4–7. This pattern repeats indefinitely.

The total number of cycles that can supported within a controller is finite. The total number that can be supported is based on the ratio of the largest supported period to the BASEPERIOD. Therefore, if the largest period is one second and the BASEPERIOD is 50 ms, there would be a total of 20 cycles. The practice of the present invention is consistent with any number of schemes for ordering control module execution within a cycle. For example, the order shown in cycle 0 (CMe, CMc, CMb and CMa) could have been chosen differently. The manner in which execution order is selected is not necessary to the understanding of the present invention and will not hereinafter be described. Although arranged in cycles, it should be noted that the execution of control modules occurs sequentially in time as illustrated in the time line below where control modules are indicated simply by their letter subscript. The time between adjacent cycles is used for executing non-periodic algorithms.

Figure 3:
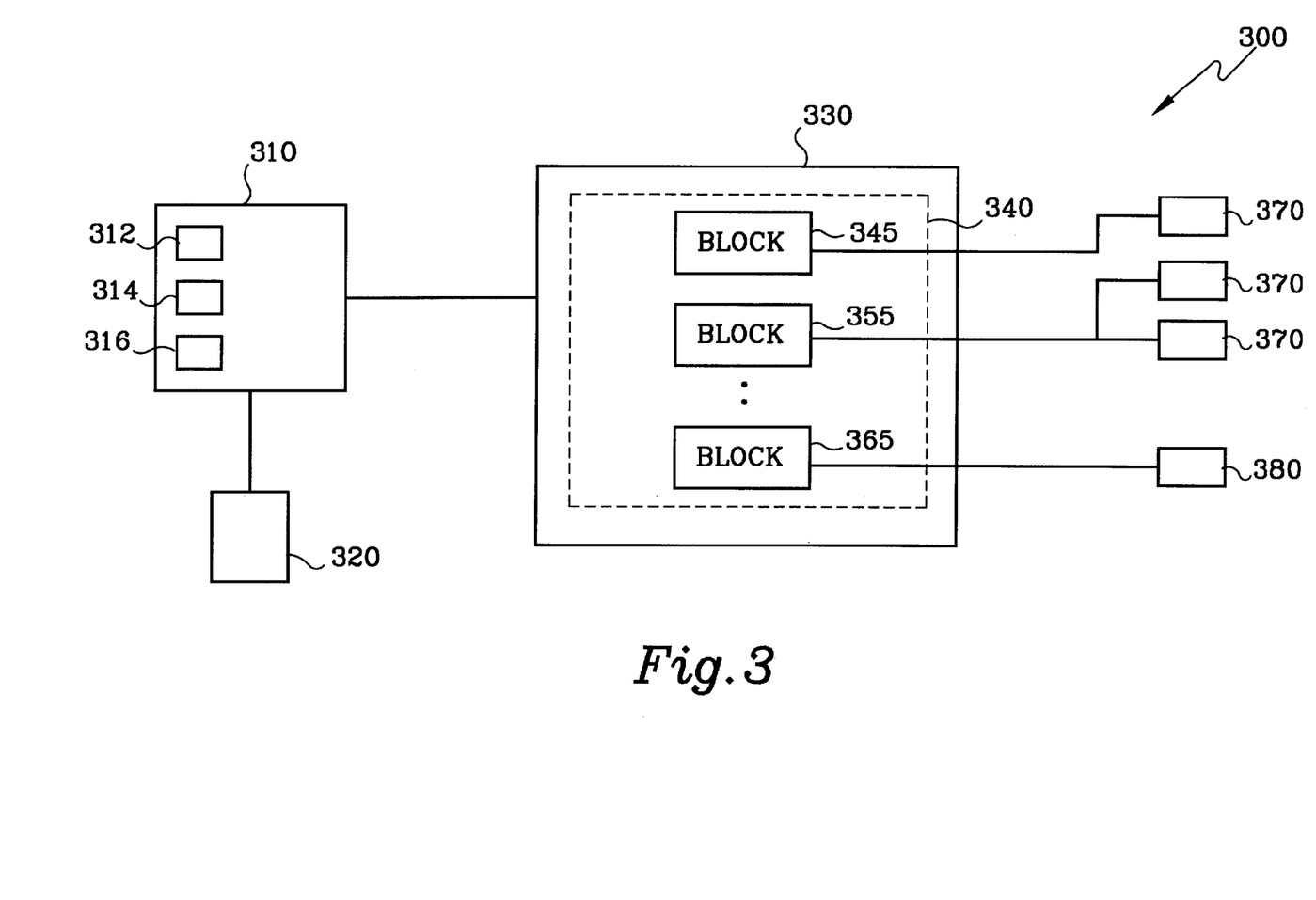
FIG. 3 illustrates an embodiment of a real-time process control system employing an embodiment of a controller constructed using the principles of the present invention in an object-oriented programming environment.

Turning now to FIG. 3, illustrated is an embodiment of a real-time process control system 300 employing an embodiment of a controller 330 constructed using the principles of the present invention in an object-oriented programming environment. The process control system 300 includes a controller 330 comprising a plurality of control modules (one is shown and designated 340). The control module 340 also includes a plurality of algorithm blocks; three algorithm blocks are shown and are designated as first, second and third blocks 345, 355, 365. In the illustrated embodiment, the first and second blocks 345, 355 are coupled to, or associated with, a plurality of transducers (generally designated as 370), such as temperature or pressure sensors that are used to monitor the process environment, while the third block 365 is coupled to, or associated with, an actuator 380. The controller 330 is also coupled to an Application Builder 310, which may be a set of software services executing in a supervisory workstation. The Application Builder 310 is also shown coupled to a data entry and display device 320, such as a conventional computer and monitor, that provides an end user a means to input and monitor process data. In the illustrated embodiment, the Application Builder 310 also includes first, second and third model components 312, 314, 316 corresponding to the first, second and third blocks 345, 355, 365, respectively. The model, in an advantageous embodiment, contains configuration data which include the algorithm block type, count for each block type, algorithm execution time, data flow connection count (input parameters) and data flow execution time of the block.

As described previously, the Application Builder 310 constructs the control module 340 (used to perform algorithm processing) using the first, second and third blocks 345, 355, 365. The Application Builder 310 also creates within the control module 340 connections between block parameters and assign values to the process configuration parameters, which include the parameters PERIOD, ESTWEIGHT and PHASE discussed previously.

The task of balancing processing load includes assigning a value of PHASE to each Control Module 340. The PHASE values must be assigned so that each cycle spends about the same amount of time executing the Control Modules 340. To balance the processing load, information conveyed by parameter ESTWEIGHT is essential. The parameter ESTWEIGHT makes up one element of a Control Module's 340 configuration data and is typically loaded to the controller 330 when the Control Module 340 is first configured. By summing ESTWEIGHT for each Control Module 340 within a cycle, the controller 330 may determine how much execution time will be required for that cycle. Relative loading of cycles can be then compared or modified as appropriate.

Although used by the controller 330, ESTWEIGHT is not computed by the controller 330. It may be determined by one of two methods, both of which are outside the scope of the controller 330. The first method is for ESTWEIGHT to be computed by an end user. This may be done on the basis of statistical timing data provided by the controller 330 itself. For example, the controller 330 may provide measurements of cycle execution time or Control Module 340 execution time from which an end user could formulate a value for ESTWEIGHT. Once obtained, the ESTWEIGHT value can then be attached to the Control Module 340 using a Builder configuration interface (data entry and display device 320).

Developing a value for ESTWEIGHT may take some effort. However, this effort is required only as often as unique Control Module 340 configurations are created. Those skilled in the art are aware that process control configurations frequently involve multiple copies of identically configured Control Modules 340. In these cases, the same value of ESTWEIGHT may be used for all copies identically configured Control Modules 340.

The second method for computing ESTWEIGHT is for the Builder 310 to employ a mathematical model of Control Module 340 execution times. The nature of the mathematical model used is not necessary for an understanding of the present invention. It need only satisfy the requirement that, based on the configuration characteristics of the Control Module 340, the mathematical model computes a fairly accurate estimate of execution time. As one example, a sufficient model might be a set of linear equations which compute ESTWEIGHT by knowing the typical execution time for each type of component algorithm block, the typical connection execution time for an input parameter of each component algorithm block, and the overhead execution time for the Control Module 340 itself.

The present invention contemplates means for the end user to indicate whether the end user wishes to supply a value for ESTWEIGHT, or have the Builder 310 automatically compute an estimate. One way to accomplish this is for the end user to leave ESTWEIGHT at a null value to indicate that automatic computation is required, or set it to a non-null value if automatic computation is to be disabled.

After creating the Control Module 340, the Application Builder 310 loads configuration data to the Control Module 340, using conventional techniques well-known in the art, to the controller 330.

When a Control Module 340 configuration is loaded to the controller 330, the load balancing algorithm depends on the value of PHASE; PHASE will either be null or non-null (not to be confused with null and non-null values of ESTWEIGHT). A non-null PHASE value indicates that the end user wishes to override the automatic balancing process otherwise conducted by the controller 330. If the end user wishes to directly control which set of cycles a Control Module 340 will execute on, the end user may directly assigns the desired PHASE value. For example, the end user could have assigned CMd referenced in TABLE 2 above, to run in phase 1.

If the received PHASE value is null, the controller 330 interprets this to indicate that automatically load balancing is desired and proceeds with the operations that will hereinafter be described. It should be noted that regardless of which method is used to determine the PHASE value, the PHASE value may be subjected to further validation checks before being accepted by the controller 330 (which will also be described hereinafter). It should also be noted that the use of null and non-null values of PHASE to indicate when automatic load balancing is requested is by convention only. Other methods to indicate this distinction may be employed and are within the broad scope of the present invention.

When the controller 330 determines that the loaded value of PHASE is null, i.e., the end user has not preselected a value, the controller 330 assigns a candidate value to PHASE. An exemplary algorithm to assign a value to PHASE is set forth in Table 3. The net effect of this algorithm is to select a PHASE value which will add the load to a particular set of cycles with the lowest maximum load. In an advantageous embodiment, the individual control algorithms in the Control Module 340 may be configured, loaded and balanced without interrupting the operation of other control algorithms.

TABLE 3

```
MinPhaseWeight=0;
MinPhase=0;
for all PhaseValue consistent with configured PERIOD
    MaxCycleWeight=0;
    for all Cycle consistent with PERIOD and PhaseValue {
        if (CycleWeight [Cycle]>MaxCycleWeight) {
            MaxCycleWeight=CycleWeight[Cycle];
        }
    }
    if (MinPhaseWeight==0) {
        MinPhaseWeight=MaxCycleWeight;
        MinPhase=PhaseValue;
    }
    if (MaxCycleWeight<MinPhaseWeight) {
        MinPhaseWeight=MaxCycleWeight;
        MinPhase=PhaseValue;
    }
}
CandidatePhase=MinPhase
```

Once the PHASE parameter is determined, either as the outcome of the load balancing selection, i.e., the process described in Table 3, or as an explicit configuration by the end user, the controller 330 may, in an advantageous embodiment, perform a qualification check. An exemplary qualification check algorithm is set forth in Table 4.

TABLE 4

```
for all Cycle consistent with PERIOD and CandidatePhase {
    if (CycleWeight [Cycle]>MaxCycleWeight) {
        MaxCycleWeight=CycleWeight[Cycle];
    }
}
if (MaxCycleWeight+ESTWEIGHT>MaxAllowedCycleWeight) {
    take appropriate action
}
```

It should be noted that the qualification check is not necessary to the practice of the present invention and may be eliminated. If the qualification check is employed, the "appropriate action" in Table 4, in the event of a predicted cycle overload, may vary depending on the design philosophy of the controller 330. Possible actions include rejecting the Control Module 340 load or to accept the Control Module 340 load with a warning displayed to the end user using the data entry and display device 320.

Once the Control Module 340 has been accepted and loaded to the controller 330, the controller 330 assigns a value to PHASE and updates its record of total weight for each cycle using an exemplary process set forth in Table 5. The process in Table 5 maintains this record within an array named CycleWeight[ ].

TABLE 5

```
PHASE=CandidatePhase;
for all Cycle consistent with PERIOD and PHASE{
    CycleWeight [Cycle]=Cycleweight[Cycle]+ESTWEIGHT;
}
```

Figure 4A:
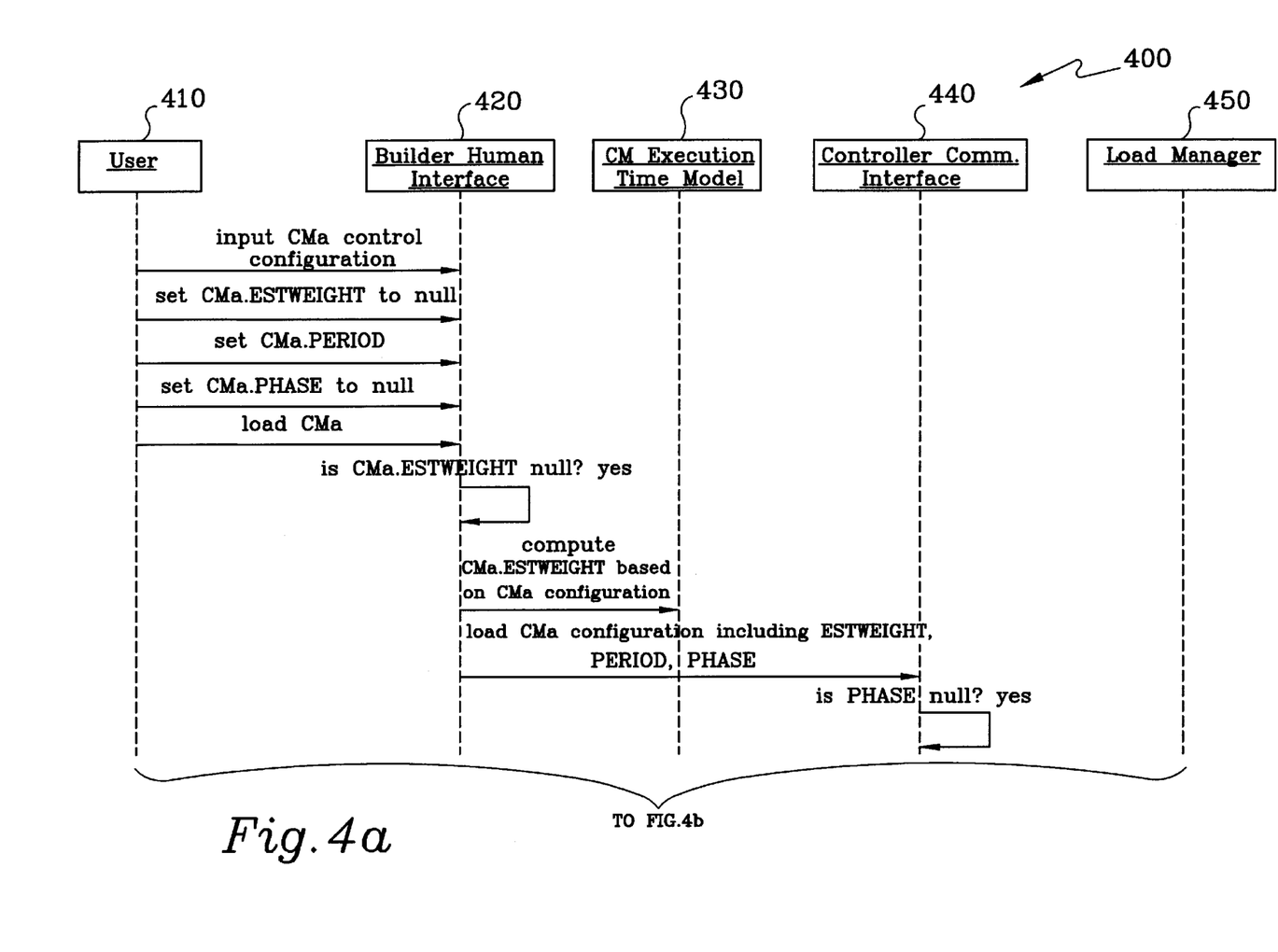
FIG. 4 illustrates an exemplary Interaction Diagram that summarizes how various subsystems interact within the present invention.
Figure 4B:
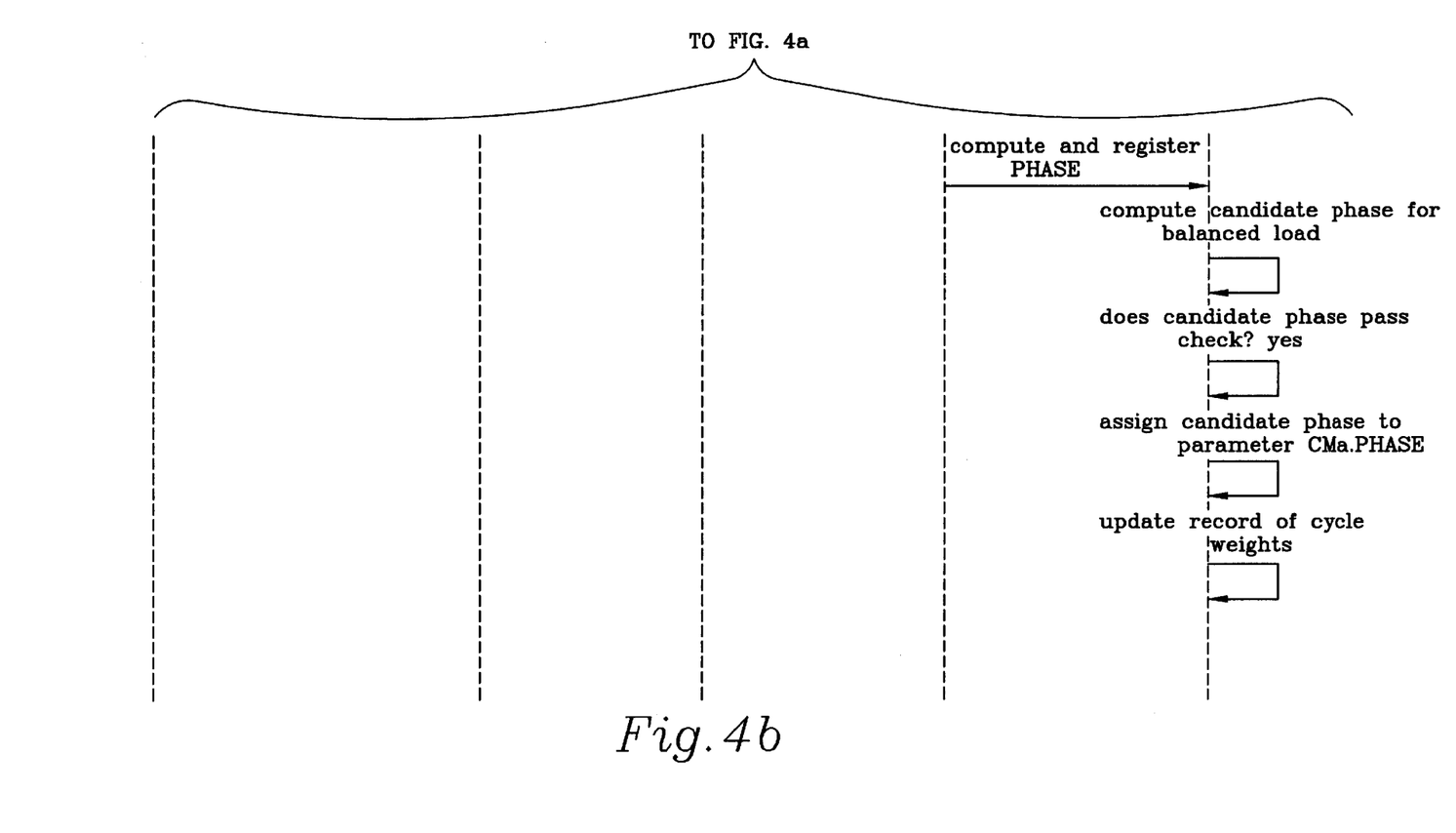

Turning now to FIG. 4, illustrated is an exemplary Interaction Diagram 400 that summarizes how various subsystems interact within the present invention. The Interaction Diagram 400 includes the following "objects": an User 410, a Builder Human Interface 420, a Control Module Execution Time Model 430, a Controller Communication Interface 440 and a Load Manager 450.

The User 410 corresponds to an end user, who is configuring a Control Module called CMa. The Builder Human Interface 420 corresponds to a computer (analogous to the data entry and display device 320 illustrated in FIG. 3) through which the User 410 inputs his configuration specifications to the Builder. The Control Module Execution Time Model 430 corresponds to the "intelligence" within the Builder which holds a model of how to compute Control Modules execution times from known configuration data. The Builder Human Interface 420 and the Control Module Execution Time Model 430 may be both thought of as part of the Builder. The Controller Communication Interface 440 corresponds to the subsystem within the controller which communicates with the Application Builder and the Load Manager 450 may be though of as the subsystem within the controller which manages Control Module processing load.

The Interaction Diagram 400 shows a sequence of messages passed between subsystems at the time that a control module is configured and loaded. The process starts with a set of interactions between the User 410 and the Builder 420, in which the User 410 enters configuration data and, when entry is complete, commands load. The User's 410 load command triggers the Builder 420 to access the Model 430 and then initiate the load to the Controller Communication Interface 440. The Load Manager 450, within the controller, receives the load data from the Controller Communication Interface 440 and processes the data received. The Load Manager 450 then triggers execution of the pseudo-code described previously. For more information on how to read diagrams of the type illustrated in FIG. 4, see "Object Oriented Analysis and Design with Applications," by Grady Booch, Benjamin/Cummings (1994), which is herein incorporated by reference.

From the above, it is apparent that the present invention allows load balancing to occur through the use of a model computed execution time or through the use of an execution time measured directly by the end user. The model computation uses data which may vary with type and count of algorithm blocks and with count of data flow connections.

The present invention also allows a user measured execution time to be captured within the control algorithm and replicated when new copies of that algorithm are created. Additionally, the present invention permits balancing to occur automatically upon configuration of the control algorithm or manually at the selection of the end user. Furthermore, the present invention allows new control algorithms to be configured, tested for potential overload and balanced, without requiring the shutdown of other algorithms running within the controller.

The present invention provides the end user with the benefits of flexibility, determinism and usability within the same controller. Flexibility is provided through multiple period options and the ability to select manual or automatic balancing. Determinism is provided through the cycle and phase structure of the design. In one embodiment of the present invention, once a phase has been assigned within a controller, the algorithms are executed within a narrow, periodic band of time. Usability is provided through the ability of having configurations qualified and balanced for a load without the whole controller shutting down; through the ability to avoid manual load balancing, if desired; and through the ability to associate a measured execution time with a particular control configuration.

Although the present invention and its advantages have been described in detail, those skilled in the art should understand that they can make various changes, substitutions and alterations herein without departing from the spirit and scope of the invention in its broadest form.

What is claimed is:

1. For use in a digital process controller (DPC), a system for balancing a control algorithm processing load and distributing said load over a given time interval, comprising:
    a model for estimating an execution time of at least one control algorithm based on configuration data pertaining to said at least one control algorithm, said DPC capable of balancing and distributing said load based on said estimate; and
    a data entry process, associated with said model, that allows an empirically-determined execution time to be associated with said at least one control algorithm, said DPC capable of balancing and distributing said load based on said time in lieu of said estimate and balancing and distributing said load upon configuration of said at least one control algorithm, wherein a selected one of said estimate and said time is replicated in said model for each instance of said at least one control algorithm.

2. The system as recited in claim 1 wherein said data entry process allows said DPC to balance and distribute said load at a user-configurable time.

3. The system as recited in claim 1 wherein said model allows said at least one control algorithm to be configured and said load to be balanced and distributed without interrupting operation of other control algorithms.

4. The system as recited in claim 1 wherein said configuration data includes:
    an algorithm type,
    an algorithm execution time,
    an algorithm block count, and
    a data flow connection count.

5. The system as recited in claim 1 wherein said at least one control algorithm forms a portion of a control module having configuration parameters selected from the group consisting of:
    period,
    estimated weight, and
    phase.

6. The system as recited in claim 1 wherein said model is capable of providing an actual execution time of said at least one control algorithm to a user.

7. For use in a digital process controller (DPC), a method of balancing a control algorithm processing load and distributing said load over a given time interval, comprising:
    initializing a model for estimating an execution time of at least one control algorithm based on configuration data pertaining to said at least one control algorithm, said DPC capable of balancing and distributing said load based on said estimate;
    allowing an empirically-determined execution time to be associated with said at least one control algorithm;
    replicating a selected one of said estimate and said time in said algorithm model for each instance of said at least one control algorithm; and
    balancing and distributing said load based on a selected one of said estimate and said time, said DPC allowing said balancing and distributing to be carried out upon configuration of said at least one control algorithm.

8. The method as recited in claim 7 wherein said balancing and distributing is carried out at an user-configurable time.

9. The method as recited in claim 7 wherein said balancing and distributing is carried out without interrupting operation of other control algorithms.

10. The method as recited in claim 7 wherein said configuration data includes:
    an algorithm type,
    an algorithm execution time,
    an algorithm block count, and
    a data flow connection count.

11. The method as recited in claim 7 wherein said at least one control algorithm forms a portion of a control module having configuration parameters selected from the group consisting of:
    period,
    estimated weight, and
    phase.

12. The method as recited in claim 7 further comprising providing an actual execution time of said at least one control algorithm to a user.

13. A real time plant control system, comprising:
    a plurality of sensors and controllable devices;
    a digital process controller (DPC), coupled to said plurality of sensors and controllable devices and capable of executing control algorithms to receive sensed data from said plurality of sensors and provide control data to said plurality of controllable devices; and
    a system for balancing a processing load of said at least one control algorithms and distributing said load over a given time interval, including:
        a model for estimating an execution time of at least one control algorithm based on configuration data pertaining to said at least one control algorithm, said DPC capable of balancing and distributing said load based on said estimate, and
        a data entry process, associated with said model, that allows an empirically-determined execution time to be associated with said at least one control algorithm, said DPC capable of balancing and distributing said load based on said time in lieu of said estimate and balancing and distributing said load upon configuration of said at least one control algorithm, wherein a selected one of said estimate and said times is replicated in said algorithm model for each instance of ones of said control algorithms.

14. The system as recited in claim 13 wherein said data entry process allows said DPC balance and distribute said load at a user-configurable time.

15. The system as recited in claim 13 wherein said model allows one of said control algorithms to be configured and said load to be balanced and distributed without interrupting operation of other control algorithms.

16. The system as recited in claim 13 wherein said configuration data includes:

an algorithm type, an algorithm execution time, an algorithm block count, and a data flow connection count.

17. The system as recited in claim 13 wherein said control algorithms form a portion of a control module having configuration parameters selected from the group consisting of:

period, estimated weight, and phase.

18. The system as recited in claim 13 wherein said model is capable of providing an actual execution time of said control algorithms to a user.

* * * * *